Sept. 13, 1960     W. W. CUSHMAN     2,952,336
CABLE SNUBBING DEVICE
Filed June 20, 1958
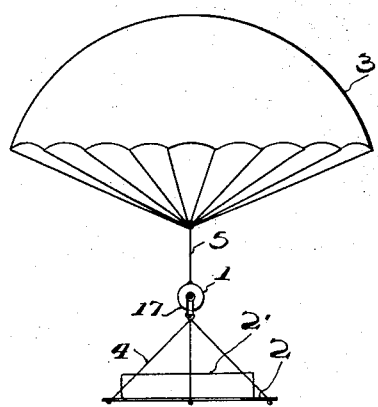
Fig. 1.
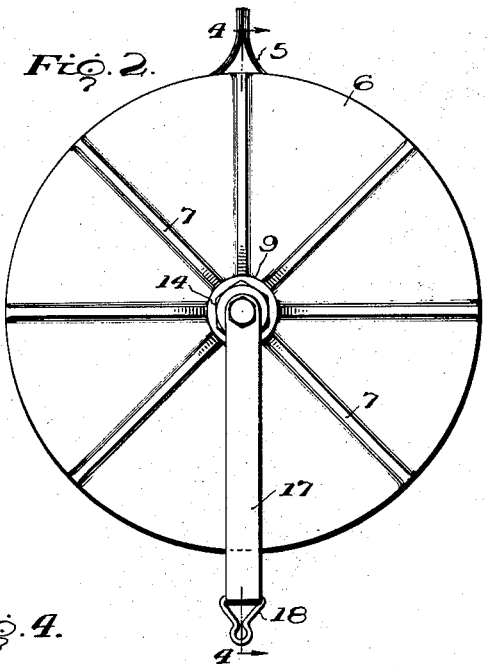
Fig. 2.
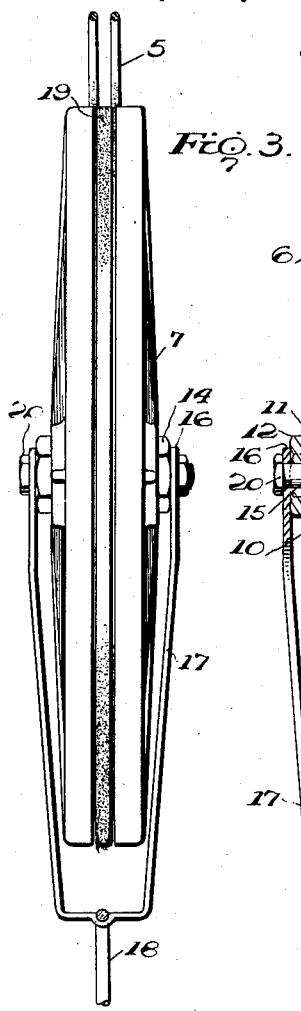
Fig. 3.
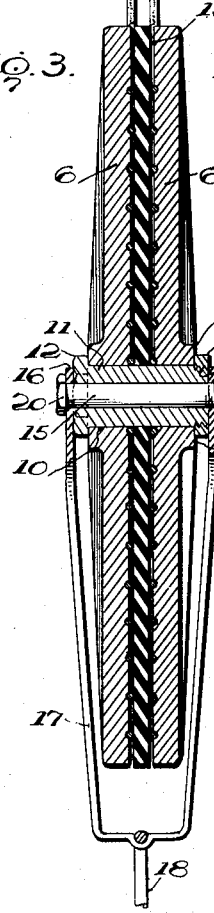
Fig. 4.
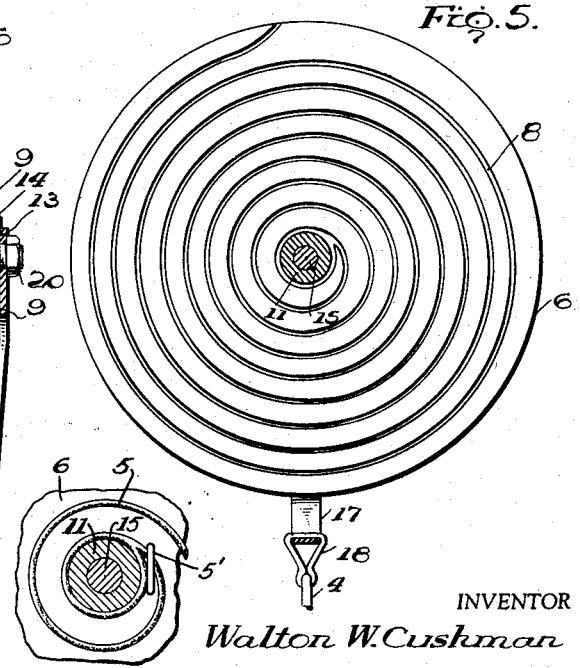
Fig. 5.
Fig. 6.
INVENTOR
Walton W. Cushman
BY
ATTORNEY 2,952,336
CABLE SNUBBING DEVICE Walton W. Cushman, Webb City, Mo.
(6428 Lumon Drive SE., Washington 22, D.C.)

Filed June 20, 1958, Ser. No. 743,514

5 Claims. (Cl. 188—65.1)

(Granted under Title 35, U.S. Code (1952), sec. 266)

The invention described herein, if patented, may be manufactured and used by or for the Government for governmental purposes, without the payment to me of any royalty thereon.

This invention relates to a shock absorber of the cable snubbing type and has for its primary object to provide a snubber which may be more readily manufactured and at less cost than snubbers now in use.

Another object of the invention consists in providing a snubber which will have a more "constant drag" and one in which the "drag" is more proportionate to the velocity of the load with respect to the parachute.

A further object of the invention consists in the provision of a cable snubber which is easier to rewind and which provides a greater cooling surface.

A still further object of the invention resides in the provision of a snubber which is more readily applied and more readily packed and shipped because of its pancake construction.

Other objects and advantages of the invention will be apparent from the following description taken in connection with the accompanying drawings, in which, Fig. 1 is a more or less diagrammatic view showing the snubber shock absorber in relation to a parachute and its load;

Fig. 2 is a front elevational view of the cable-holding reel of the snubber shock absorber;

Fig. 3 is an edge elevational view thereof;

Fig. 4 is a longitudinal sectional view taken on lines 4—4 of Fig. 2;

Fig. 5 is a plan view showing the inner face of one of the disks and showing the spiral groove formed therein; and Figure 6 is an enlarged fragmentary sectional view showing one means for anchoring the inner end of one of the cables.

Referring to the drawings in more detail and by reference numeral, the numeral 1 indicates the shock absorbing snubber in a general way as interposed between a loaded platform 2 and a parachute 3. In this arrangement, the platform with its load 2' is attached to the snubber by lines 4 and the snubber is in turn attached to the shrouds of the parachute by the cable or cables 5 which may be anchored at their inner ends by staples or the like.

The snubbing device disclosed herein has been illustrated with two disks 6 which are identical and two cables 5. A description of one of the disks will suffice, it being understood that the only difference between them is that one is right-handed and the other left-handed. The outer faces of each of the disks is reinforced by radially extending integral webs or fins 7. The inner face of each of the disks is provided with a spiral groove starting at the center of the disk and extending outwardly to the outer periphery thereof as clearly indicated in Fig. 5. These grooves which are right and left-handed in the respective disks are indicated by the numeral 8.

Each disk is provided with a hub portion 9 and a central opening 10 in which is positioned a bushing 11 having a flange 12 on one end for engaging the hub of the adjacent disk and being threaded at its other end as indicated by the numeral 13 to receive a clamping nut 14. This bushing in turn receives an axle 15 on the ends of which are received the eyes 16 of a hanger 17 provided with a clevis 18 to which the lines 4 of the load-carrying platform are attached.

Where two cables and two disks are employed, as indicated in the present illustration, the cables are laid in the right and left-hand grooves 8 of the two disks 6 as clearly indicated in Figs. 4 and 5 and the disks are assembled in face-to-face relationship with a blanket 19 of rubber or other compressible material clamped therebetween as shown in Fig. 4. This clamping of the cables in their spiral grooves by contact with the rubber blanket 19 is accomplished by tightening up on a nut 14 of the bushing 11 so as to force the two disks towards each other, thereby compressing the rubber blanket into engagement with the cables to the desired extent. The eyes 16 of the hanger 17 are engaged over the ends of the axle 15 and secured in position thereon by threading the nuts 20 into position.

In the operation of the device, it will be understood that when the load with its attached parachute and shock absorbing snubber is discharged from an airborne vehicle, the impact of the shock transmitted to the parachute by the load will be considerably alleviated by reason of the cables 5 being gradually payed out from the snubber disks 6. This gradual unwinding of the cables is due to the fact that the rubber contacting the cables must be greatly distorted in order that the cables may leave their grooves in the disks 6—6. The resistance to release of the cables from their positions in the spiral grooves will gradually increase as the releasing movement travels from the periphery toward the center of the snubber until the cables are entirely released from the grooves and the load takes its final position relative to the parachute. In this particular arrangement of the disks, cables and rubber blanket, it will be apparent that the shock-absorbing snubber may be repeatedly used and that after each use it may be readily restored to an operative condition by removing the nuts 20 and 14 and separating the disks 6 so that the cables may be relaid in the grooves and the parts reassembled.

In accordance with the patent statutes, I have described what I now consider to be the preferred form of the invention, but inasmuch as various minor changes may be made in structural details without departing from the spirit of the invention, it is intended that all such changes be included within the scope of of the appended claims.

I claim:

1. A snubber type shock absorber comprising a disk provided with a spiral groove in one face thereof extending from the center of the disk to its outer periphery, a flexible cable laid in said groove with its inner end fixed to the disk and its outer end passing beyond the outer periphery thereof, a blanket of rubber or the like applied to that side of the disk in which the cable is laid, and means for causing the rubber to press against the cable so as to releasably retain the cable within the groove.

2. A snubber type shock absorber comprising an axle, a disk rotatably mounted thereon and provided with a spiral groove in one face thereof extending from the center of the disk to its outer periphery, a flexible cable laid in said groove with its inner end fixed to the disk and its outer end passing beyond the outer periphery thereof, a blanket of rubber or the like applied to that side of the disk in which the cable is laid, and means for causing the rubber to press against the cable so as to releasably retain the cable within the groove.

3. A snubber type shock absorber comprising an axle, a bushing rotatably mounted thereon, a disk fixed to the bushing and provided with a spiral groove, a flexible cable laid in said groove with its inner end fixed to the disk and its outer end passing beyond the outer periphery thereof, a blanket of rubber or the like applied to that side of the disk in which the cable is laid, and means for causing the rubber to press against the cable so as to releasably retain the cable within the groove.

4. A snubber type shock absorber comprising an axle, a bushing rotatably mounted thereon, a hanger having its ends fixed to the ends of the axle, a disk fixed to the bushing and provided with a spiral groove, a flexible cable laid in said groove with its inner end fixed to the disk and its outer end passing beyond the outer periphery thereof, a blanket of rubber or the like applied to that side of the disk in which the cable is laid, and means for causing the rubber to press against the cable so as to releasably retain the cable within the groove.

5. A snubber type shock absorber comprising a pair of disks each provided with a spiral groove in its inner face and extending from the center to its outer periphery, a flexible cable laid in each groove with its inner end fixed to the disk and its outer end passing beyond the outer periphery thereof, a blanket of rubber or the like disposed between the disks so as to releasably retain the cables within the grooves when in unimpacted condition, an axle passing through the centers of the disks, a bushing on the axle, and means for clamping the bushing to the disks and compressing the rubber blanket into operative relationship with the cables.

References Cited in the file of this patent

UNITED STATES PATENTS

| | | |
|---|---|---|
| 1,272,254 | Green | July 9, 1918 |
| 2,156,294 | Kessenich | May 2, 1939 |
| 2,560,637 | Doolittle | July 15, 1951 |
| 2,626,117 | Heinrich | Jan. 20, 1953 |
| 2,680,593 | McIntyre | June 8, 1954 |